(12) United States Patent
Fortin et al.

(10) Patent No.: US 9,731,581 B2
(45) Date of Patent: Aug. 15, 2017

(54) VEHICLE DOOR AND DOOR MODULE WITH MULTI-PORTION DOOR CARRIER

(71) Applicant: Magna Closures Inc., Newmarket (CA)

(72) Inventors: Raymond Edward Fortin, Newmarket (CA); Arthur J. W. Henes, Etobicoke (CA); Eric V. Kalliomaki, Uxbridge (CA)

(73) Assignee: MAGNA CLOSURES INC., New Market (CA)

( * ) Notice: Subject to any disclaimer, the term of this patent is extended or adjusted under 35 U.S.C. 154(b) by 0 days.

(21) Appl. No.: 14/165,814

(22) Filed: Jan. 28, 2014

(65) Prior Publication Data

US 2014/0208656 A1    Jul. 31, 2014

Related U.S. Application Data

(60) Provisional application No. 61/758,005, filed on Jan. 29, 2013.

(51) Int. Cl.
*B60J 5/04* (2006.01)
*B60J 5/06* (2006.01)
*E05B 65/08* (2006.01)

(52) U.S. Cl.
CPC .......... *B60J 5/0416* (2013.01); *B60J 5/0418* (2013.01); *B60J 5/06* (2013.01); *E05B 65/08* (2013.01)

(58) Field of Classification Search
CPC ....... B60J 5/0413; B60J 5/0416; B60J 5/0418
See application file for complete search history.

(56) References Cited

U.S. PATENT DOCUMENTS

| | | | | |
|---|---|---|---|---|
| 5,090,158 | A * | 2/1992 | Bertolini | B60J 5/0416 49/348 |
| 6,341,448 | B1 * | 1/2002 | Murray et al. | 49/280 |
| 6,449,907 | B2 * | 9/2002 | Nishikawa et al. | 49/502 |
| 6,453,615 | B1 * | 9/2002 | Berta et al. | 49/349 |
| 6,493,919 | B2 * | 12/2002 | Morrison et al. | 29/434 |
| 6,862,846 | B1 * | 3/2005 | Kirejczyk | 49/502 |
| 7,192,076 | B2 * | 3/2007 | Ottino | 296/146.1 |
| 7,341,291 | B2 * | 3/2008 | Ooe et al. | 292/336.3 |
| 7,424,788 | B2 * | 9/2008 | Kirejczyk | 49/352 |
| 7,774,986 | B2 * | 8/2010 | Unterreiner | B60J 5/0404 49/349 |
| 7,784,851 | B2 * | 8/2010 | Filipczak | B60J 5/0418 296/146.1 |
| 7,992,347 | B2 * | 8/2011 | Roy et al. | 49/502 |

(Continued)

*Primary Examiner* — Jerry Redman
*Assistant Examiner* — Catherine A Kelly
(74) *Attorney, Agent, or Firm* — Grant Tisdall; Gowling WLG (Canada) LLP

(57) ABSTRACT

A vehicle door comprising an outer door panel an inner door panel and a door module. The inner door panel is joined to the outer door panel so as to define a door cavity between the inner and outer door panels. The inner door panel has an aperture providing access to the door cavity. The door module includes a plurality of carrier portions including a first carrier portion that holds at least one functional door hardware component and a second carrier portion that holds at least one other functional door hardware component. The plurality of carrier portions are mounted to the inner panel to seal the aperture thereby defining a wet side of the door module facing towards the door cavity and a dry side of the door module facing away from the door cavity.

14 Claims, 21 Drawing Sheets

(56) References Cited

U.S. PATENT DOCUMENTS

| | | | |
|---|---|---|---|
| 8,556,332 B2* | 10/2013 | Nakashima et al. | 296/146.7 |
| 8,840,169 B2* | 9/2014 | Tanizawa | 296/146.7 |
| 2007/0296245 A1* | 12/2007 | Kriese et al. | 296/155 |
| 2013/0169002 A1* | 7/2013 | M bius et al. | 296/187.03 |

* cited by examiner

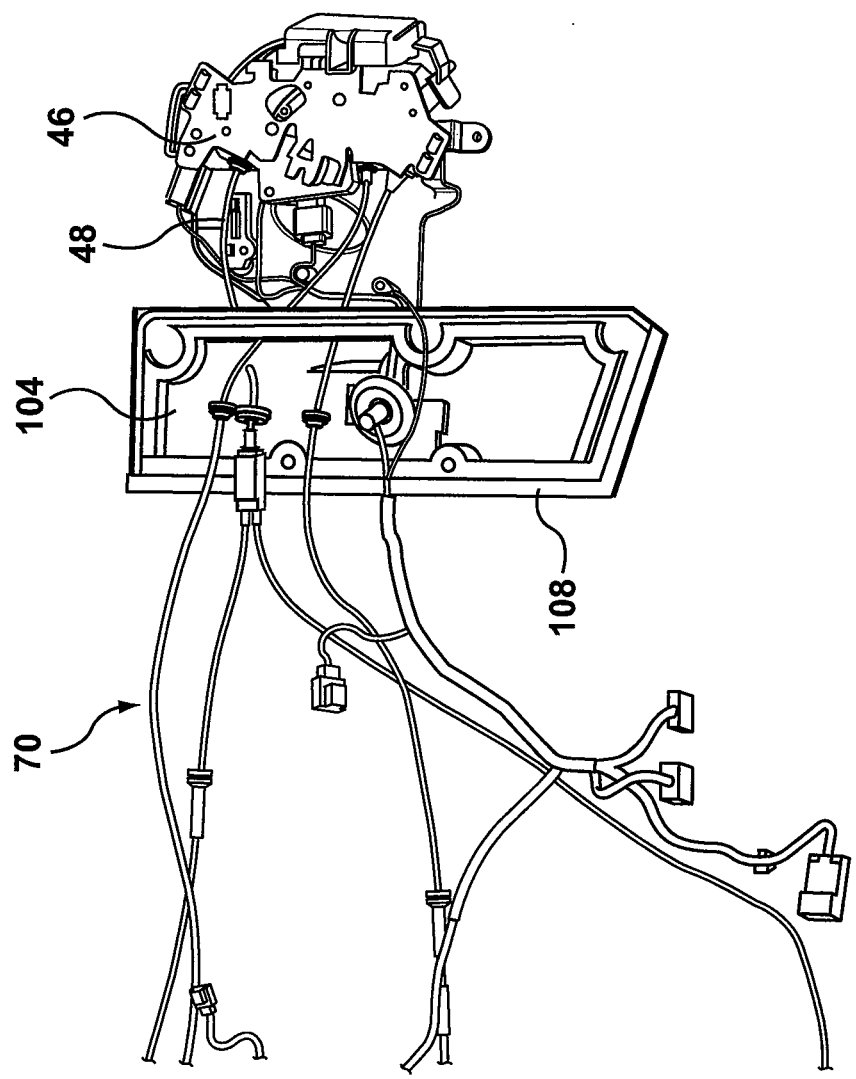

VEHICLE DOOR AND DOOR MODULE WITH MULTI-PORTION DOOR CARRIER

CROSS-REFERENCE TO PRIOR APPLICATION

This US patent application claims the benefit of U.S. Provisional Patent Application Ser. No. 61/758,005 filed Jan. 29, 2013, entitled "VEHICLE DOOR AND DOOR MODULE WITH TWO-PIECE DOOR CARRIER", the entire disclosure of the application being considered part of the disclosure of this application and hereby incorporated by reference.

FIELD

This disclosure relates generally to vehicle doors and door modules.

BACKGROUND

In a door module, a variety of functional door hardware components are pre-assembled onto a single plate or some other form of single carrier so that these components can all be loaded into a vehicle door at one time via the single plate/carrier on the vehicle assembly line and save assembly steps.

It is also known to utilize a door module for a sliding vehicle door such as found in passenger minivans. However, some door modules for sliding vehicle doors do not include components such as locking mechanisms. Instead, the locking mechanisms are separately installed within the door cavity, making the locking mechanisms difficult to service, as the entire module must be removed in order to access the locking mechanisms. Furthermore, the installation of a locking mechanism after the door module has been installed is typically carried out by inserting the locking mechanism through a relatively small hole in the door module, which complicates the installation process.

SUMMARY it is an object of the present invention to provide a door module that obviates or mitigates at least some of the above-presented disadvantages in the art.

A first aspect provided is a vehicle door for providing access to a vehicle interior, the vehicle door comprising: an outer door panel; an inner door panel connected to the outer door panel defining a door cavity there-between, the inner door panel having an aperture for providing access to the door cavity; a door module mounted to the inner door panel about the aperture by one or more module fasteners, the door module including a first carrier portion having mounted thereon a first functional door hardware component and a second carrier portion having mounted thereon a second functional door hardware component, the first carrier portion releasably secured to the second carrier portion by a one or more carrier fasteners; and a first seal member between the door module and the inner door panel for sealing the aperture to inhibit communication of moisture from the cavity to the vehicle interior.

A further aspect provided is a second seal member between the first carrier portion and the second carrier portion to inhibit communication of the moisture between the first carrier portion and the second carrier portion.

A further aspect provided is where the second carrier portion is configured as removable from the inner door panel by releasing the one or more carrier fasteners the while maintaining the mounting of the first carrier portion on the inner door panel by the one or more module fasteners.

A further aspect provided is where the second carrier portion is mounted to both the inner door panel by the one or more module fasteners and the first carrier portion by the one or more carrier fasteners.

A further aspect provided is method of mounting a door module to a vehicle door having an inner door panel connected to the outer door panel defining a door cavity there-between, the inner door panel having an aperture for providing access to the door cavity, the method comprising: a) mounting the door module to the inner door panel including a first carrier portion, a second carrier portion and a first seal member between the door module and the inner door panel for sealing the aperture to inhibit communication of moisture from the cavity to the vehicle interior, wherein step a) includes: i) mounting the first carrier portion that has at least one functional door hardware component to the inner door panel, and subsequent to step i) mounting a second carrier portion that has at least one other functional door hardware component, in such a way that the second carrier portion is removable using one or more releasable carrier fasteners from the inner door panel while maintaining attachment of the first carrier portion to the inner door panel by one or more module fasteners.

A further aspect provided is vehicle door module for mounting to a vehicle door including an inner door panel connected to the outer door panel defining a door cavity there-between, the inner door panel having an aperture for providing access to the door cavity, the door module comprising: a plurality of carrier portions including a first carrier portion that has at least one functional door hardware component and a second carrier portion that has at least one other functional door hardware component; and a first seal member for situating between the door module and the inner door panel for sealing the aperture to inhibit communication of moisture from the cavity to the vehicle interior.

In an aspect, a vehicle door is provided, comprising an outer door panel an inner door panel and a door module. The inner door panel is joined to the outer door panel so as to define a door cavity between the inner and outer door panels. The inner door panel has an aperture providing access to the door cavity. The door module includes a plurality of carrier portions including a first carrier portion that holds at least one functional door hardware component and a second carrier portion that holds at least one other functional door hardware component. The plurality of carrier portions are mounted to the inner panel to seal the aperture thereby defining a wet side of the door module facing towards the door cavity and a dry side of the door module facing away from the door cavity.

In another aspect, a door module as described above is provided for use with a door including an outer door panel and an inner door panel.

In another aspect, a method mounting a door module to a vehicle door having an outer door panel and an inner door panel joined to the outer door panel so as to define a door cavity between the inner and outer door panels, the inner door panel having an aperture providing access to the door cavity, the method comprising: a) mounting a door module including a plurality of carrier portions to the inner door panel to seal the aperture thereby defining a wet side of the door module facing towards the door cavity and a dry side of the door module facing away from the door cavity, wherein step a) includes: b) mounting a first carrier portion that holds at least one functional door hardware component to the inner door panel, and c) subsequent to step b), mounting a second carrier portion that holds at least one other functional door hardware component, in such a way that the second carrier portion is removable from the inner door panel without requiring removal of the first carrier portion from the inner door panel.

BRIEF DESCRIPTION OF THE DRAWINGS

The foregoing and other aspects will now be described by way of example only with reference to the attached drawings, in which:

FIG. 4b is a plan view of the second carrier portion shown in FIG. 3;

DETAILED DESCRIPTION

Figure 1:
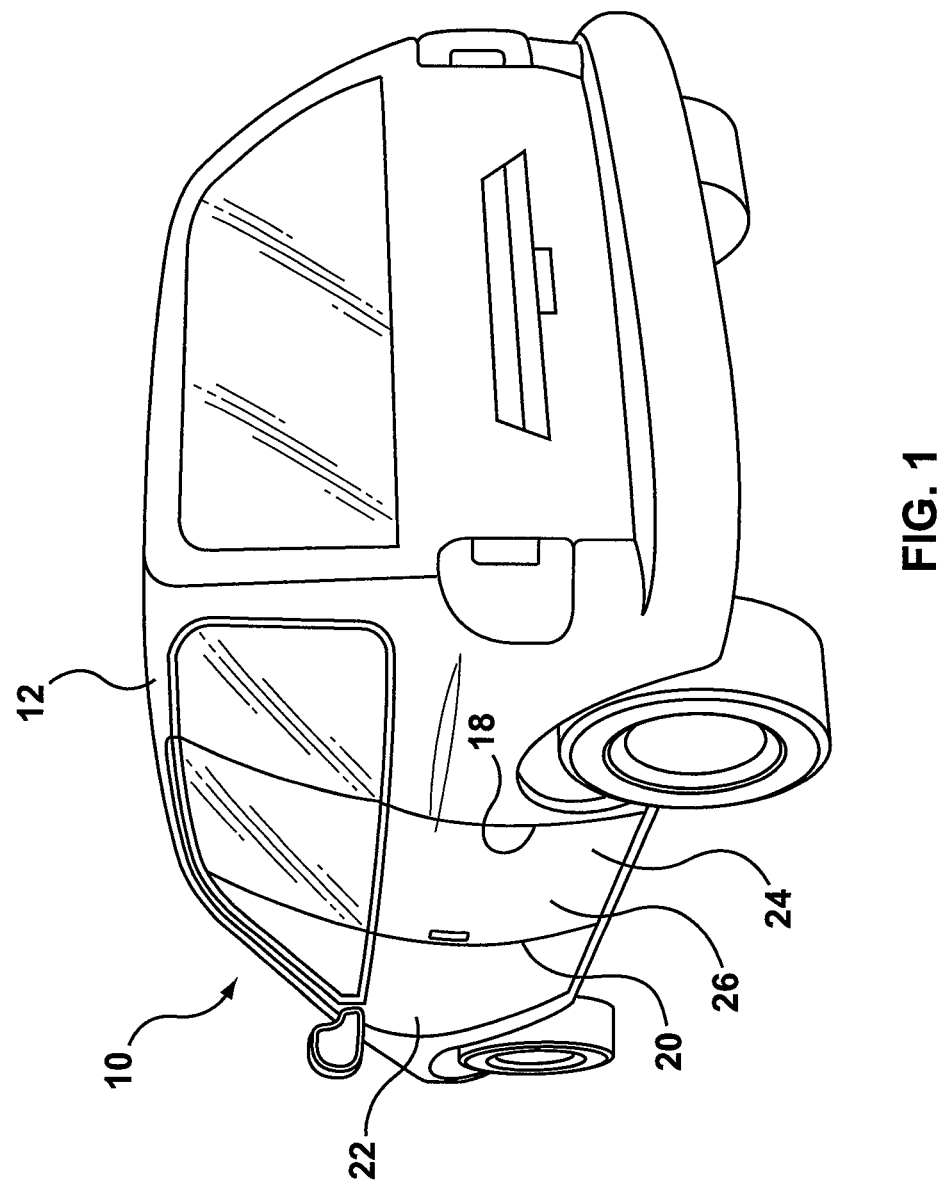
FIG. 1 is a perspective view of a vehicle.
Figure 1A:
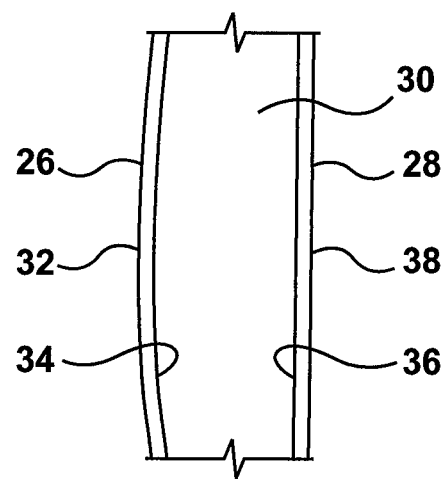
FIG. 1a is a sectional edge view of a portion of a vehicle door of the vehicle shown in FIG. 1.
Figure 2:
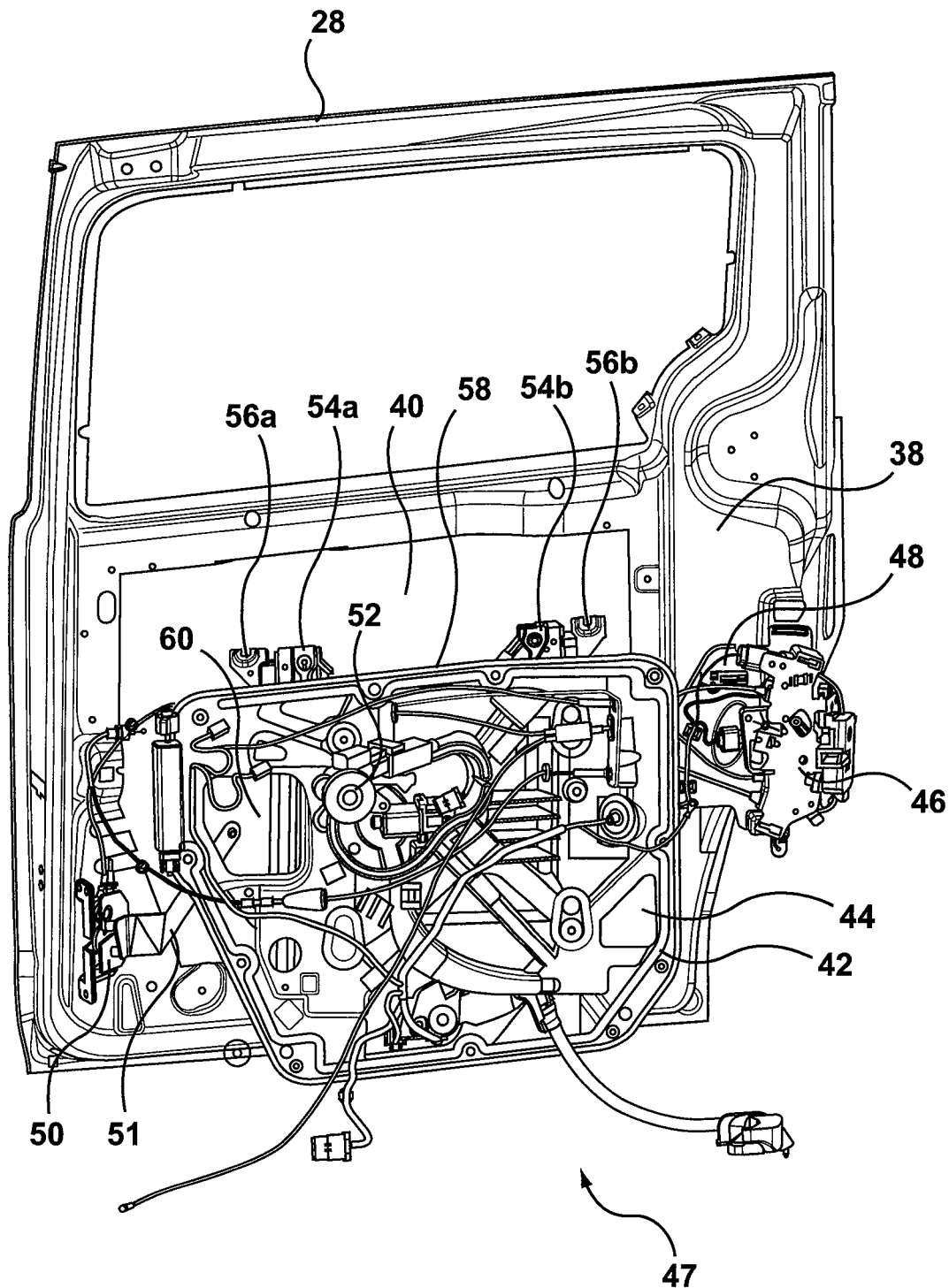
FIG. 2 is a perspective view of a portion of the vehicle door with a door module of the prior art.

FIG. 1 shows a vehicle 10, having a vehicle body 12, a hinged vehicle door 22 and a sliding vehicle door 24. The sliding door 24 has a front end 20 and a rear end 18. The vehicle door 22,24 includes an outer door panel 26 and an inner door panel 28 (see FIG. 1a). The inner door panel 28 is joined to the outer door panel 26 so as to define a door cavity 30 between the inner and outer door panels 28 and 26. Referring to FIG. 1a, the outer panel 26 has an outboard side 32 and an inboard side 34. The inner panel 28 has an outboard side 36 and an inboard side 38. As shown in FIG. 2, the inner panel 28 has an aperture 40 providing access to the door cavity 30.

FIG. 2 shows a prior art door module 42 that has been proposed for use with the vehicle door 22. As can be seen, the door module 42 includes a single carrier 44 that holds multiple door hardware components 47, such as, for example, a cinch latch 46 which is mounted to the carrier 44 via a presenter 48, a front latch 50 which is also mounted to the carrier 44 via a presenter 51, components from window regulator 53 including a window regulator motor and drum assembly 52, two guide rails 54a and 54b and two window lifter plates 56a and 56b. As such, the door hardware components 47 mounted on the single carrier 44 can be generalized to include any of; the cinch latch 46, the presenter 48, the front latch 50, the presenter 51, components from window regulator 53 including the window regulator motor and drum assembly 52, two guide rails 54a and 54b and two window lifter plates 56a and 56b, by example.

Further, such door hardware components 47 can be referred to as functional door hardware components 47 as they are provided for the purpose of performing a function such as moving a window up and down, or locking the door against the vehicle body 12. As can be seen, the tops of the guide rails 54a and 54b, the window lifter plates 56a and 56b, the cinch latch 46 and the cinch latch presenter 48, and the front latch 50 and the front latch presenter 51 all extend beyond the periphery of the single carrier 44 (shown at 58). Even though these door hardware components 47 extend beyond the periphery 58, all of these door hardware components 47 must be inserted through the aperture 40 in the inner door panel 28 so that they are positioned adjacent to the inboard side 34 (see FIG. 1a) of the inner door panel 28 (i.e. so that they are in the door cavity 30, when installing the door module 42 on the inner door panel 28. To facilitate such installation, a current solution is to make the front latch presenter 51 detachable as a separate piece from the single carrier 44 and to provide a pass-through aperture shown at 60 in the single carrier 44. The carrier 44 may then be manipulated to insert the cinch latch 46, the cinch latch presenter 48, the guide rails 54a and 54b and the lifter plates 56a and 56b through the aperture 40 and may be mounted to the inboard face 38 of the inner door panel 28. The front latch presenter 51 with the front latch 50 mounted thereto may then be inserted through the aperture 60 in the carrier 44 for mounting on the outboard side 36 of the carrier 44 and the outboard side 36 of the inner door panel 28.

There are several disadvantages to the configuration shown in FIG. 2 using a single carrier 44. One disadvantage is that it can be difficult to mount the front latch presenter 51 to the single carrier 44 via the limited access provided by the aperture 60. Furthermore, in the event of a failure of the cinch latch, the entire single carrier 44 has to be removed from the inner door panel 28 in order to access the cinch latch 46. This complete removal of the single carrier 44 can be a laborious process, and can involve detaching the front latch presenter 51 from the carrier 44, detaching the window lifter plates 56a and 56b from the window, and detaching the carrier 44 from the door panel 28. As a result, the removal and replacement of the cinch latch 46 (i.e. one of the door hardware components 47) can be a relatively expensive and time consuming process.

Figure 3:
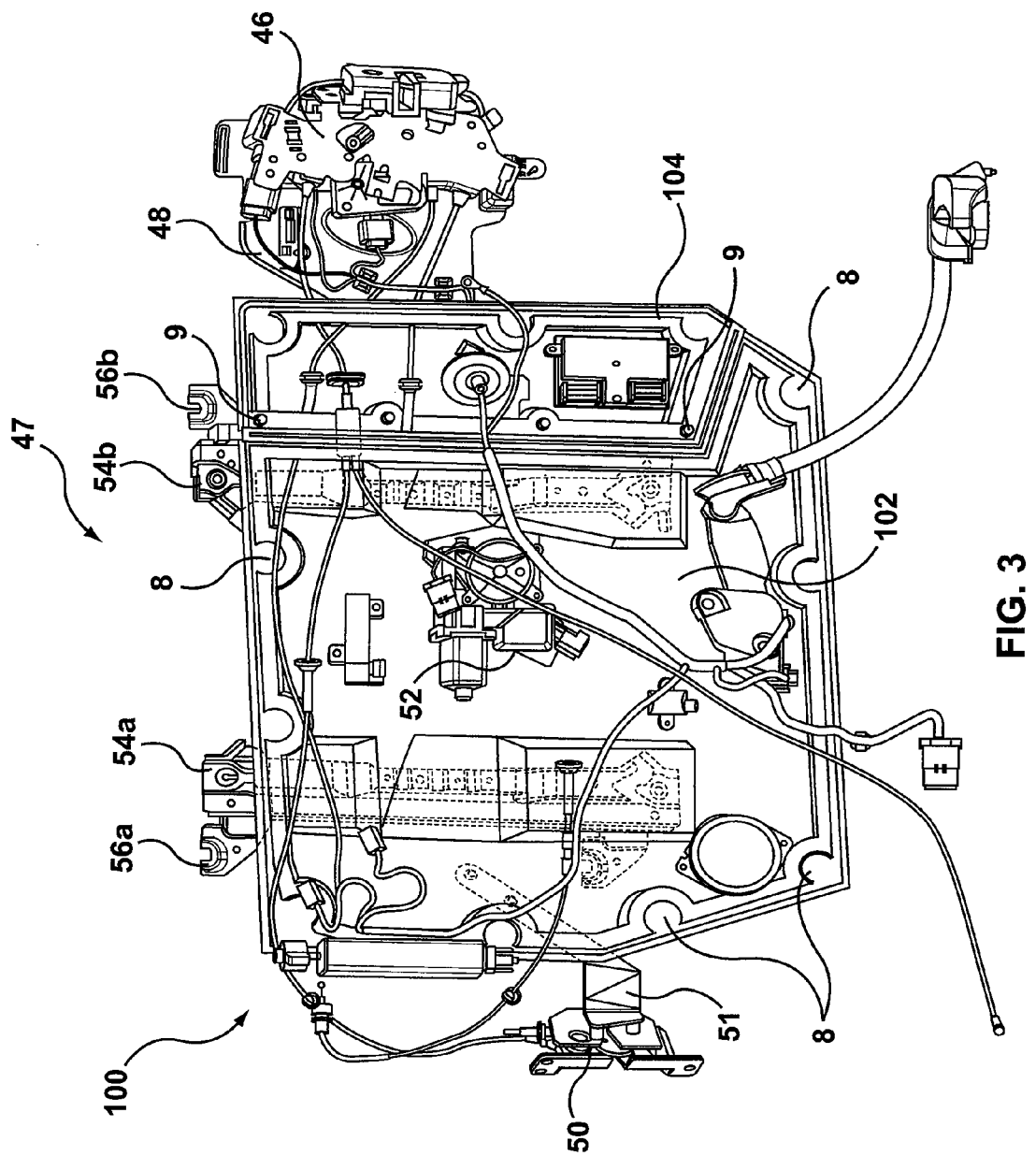
FIG. 3 is a plan view of a door module mounted to an inner door for the vehicle shown in FIG. 1 including a first carrier portion and a second carrier portion.
Figure 6:
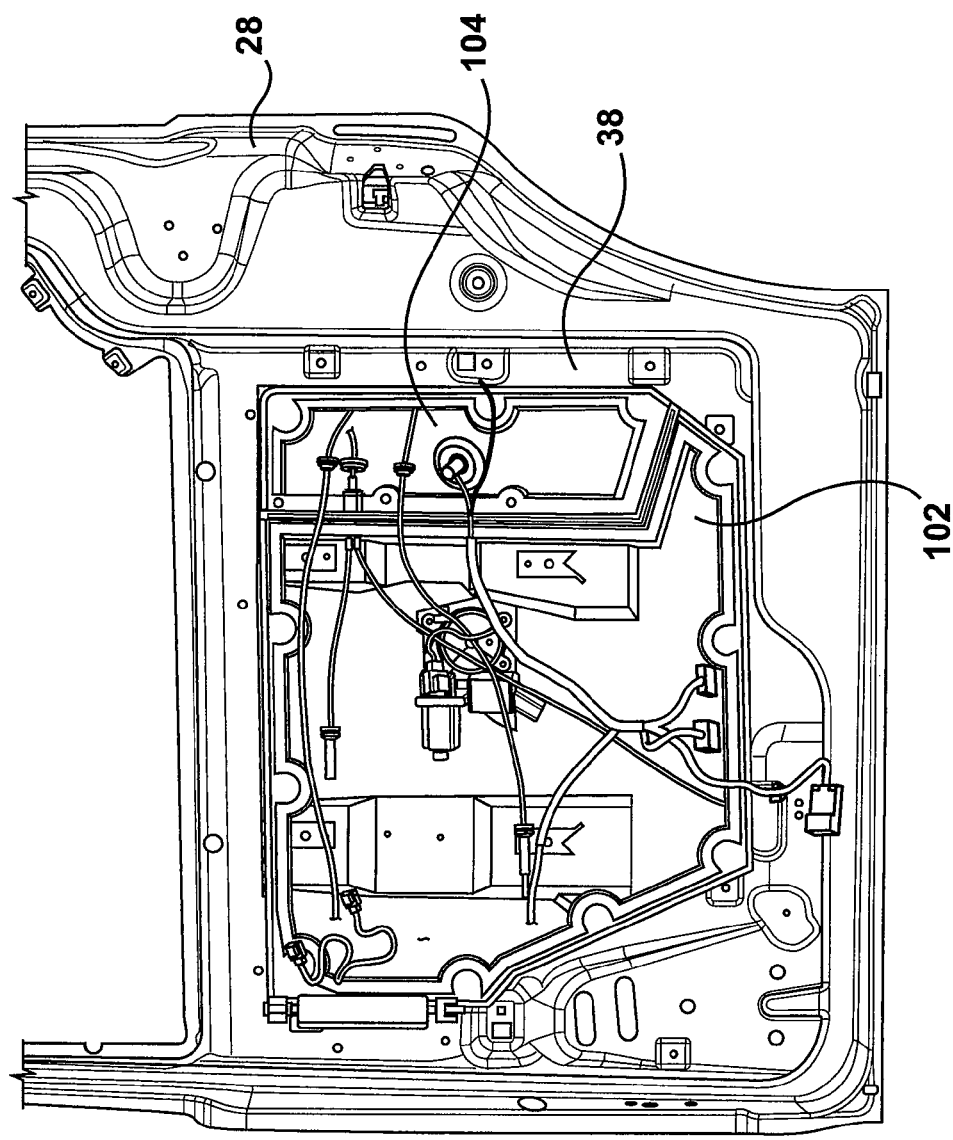

Reference is made to FIG. 3, which shows an embodiment of a door module 100. As is the case with many door modules, the door module 100 can be mounted to the inner door panel 28, as shown in FIG. 6 to simplify the mounting of door hardware components 47 such as for example, one or more of the aforementioned door hardware components 47 from the window regulator 53 (FIG. 3), the cinch latch 46 and the front latch 50, and any other suitable door hardware components 47. Aside from these aforementioned elements, the door module 100 includes a first carrier portion 102 and a second carrier portion 104. The first and second carrier portions 102 and 104 mount together (e.g. using plurality of mechanical fasteners) to the inner door panel 28 to seal the aperture 40 (see FIG. 2), thereby defining a wet side of the door module 100 (i.e. the outboard side 36, which faces the door cavity 30), and a dry side to the door module 100 (i.e. the inboard side 38, which faces away from the door cavity 30 towards the interior of the vehicle 12).

The first carrier portion 102 holds at least one door hardware component 47, which in the example shown in FIG. 3 includes the components that make up the window regulator 53 and the front latch 50, which is mounted to the first carrier portion 102 via the front latch presenter 51. The second carrier portion 104 holds at least one other door hardware component 47, which in the example shown in FIG. 3 includes the cinch latch 46, which is mounted to the second carrier portion 104 via the cinch latch presenter 48. In the embodiment shown, the cinch latch presenter 48 is integrally formed together with the second carrier portion 104, however it will be noted that the presenter 48 can alternatively be a separate door hardware component 47 that is mounted to the second carrier portion 104 via mechanical fasteners or the like. Similarly, the front latch presenter 51 is shown as being mounted to the first carrier portion 102, however it will be noted that the presenter 51 could alternatively be integrally formed together with the first carrier portion 102.

As described above, the use of multiple carrier portions 102,104 to comprise the door module 100 is preferable, as one or more of the multiple carrier portions 102,104 can be detached (e.g. via loosening of the mechanical fasteners 9 coupling the multiple carrier portions 102,104 to one another) from both the door panel 28 and the remaining carrier portion(s) 102,104, while providing for the remaining carrier portion(s) 102,104 to remain mounted to the door panel 28 via module fasteners 8. In this manner, selected door hardware component(s) 47 needing removal/repair/replacement can be facilitated by only removing only the respective carrier portion 102,104 on which the selected door hardware component(s) 47 is/are mounted, thus providing for only partial removal of the door module 100 when undergoing removal/repair/replacement of the selected door hardware component(s) 47.

As such, shown in FIG. 3 is the door module 100 for mounting to the inner door panel 28 (see FIG. 2) about the aperture 40 by one or more module fasteners 8, the door module 100 including the first carrier portion 102 having mounted thereon a first functional door hardware component 47 and a second carrier portion 104 having mounted thereon a second functional door hardware component 47, the first carrier portion 102 releasably secured to the second carrier portion 104 by a one or more carrier fasteners 9. Also provided can be a first seal member 118 (see FIG. 4c) between the door module 100 and the inner door panel 28 for sealing the aperture 40 to inhibit communication of moisture from the cavity to the vehicle interior. Referring to FIG. 4d, a second seal member 110 between the first carrier portion 102 and the second carrier portion 104 can be used to inhibit communication of the moisture between the first carrier portion 102 and the second carrier portion 104.

Figure 4A:
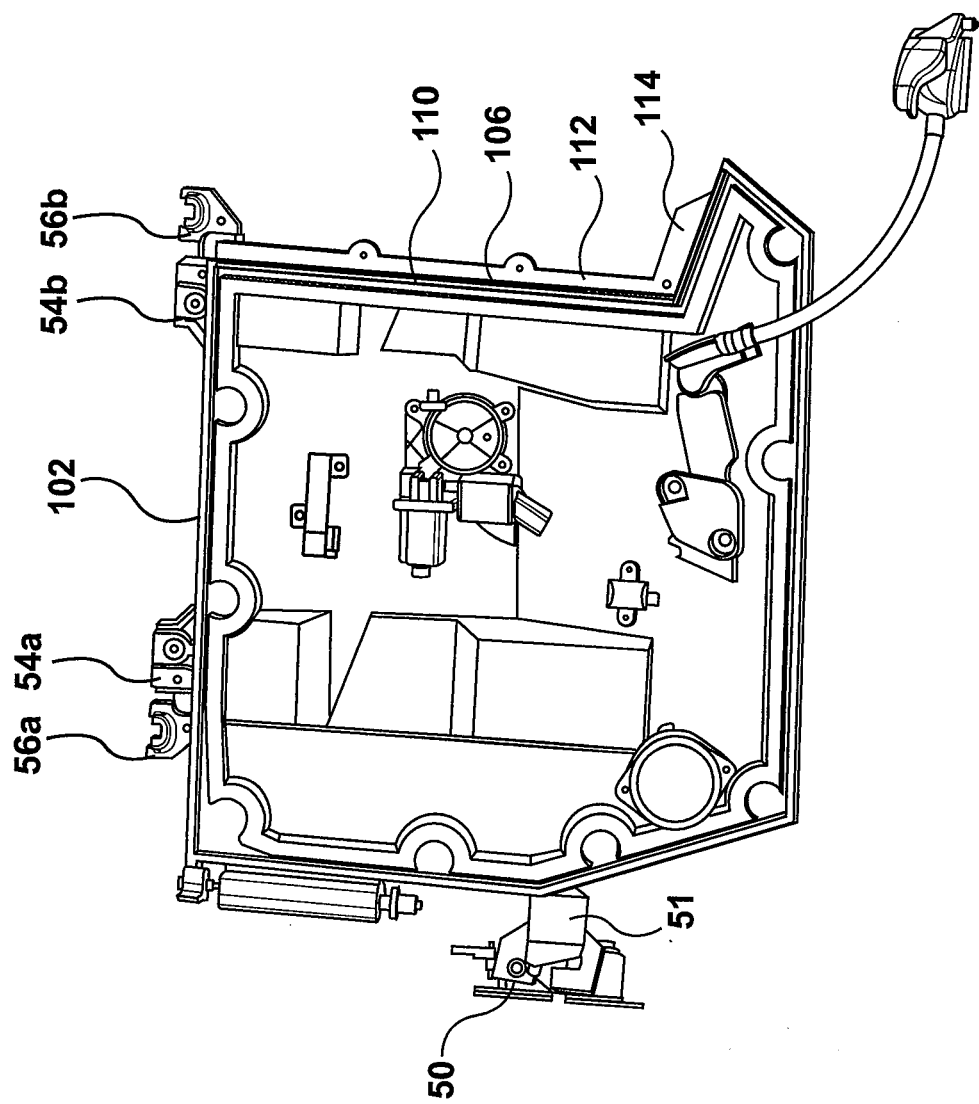
FIG. 4a is a plan view of the first carrier portion shown in FIG. 3.
Figure 4C:
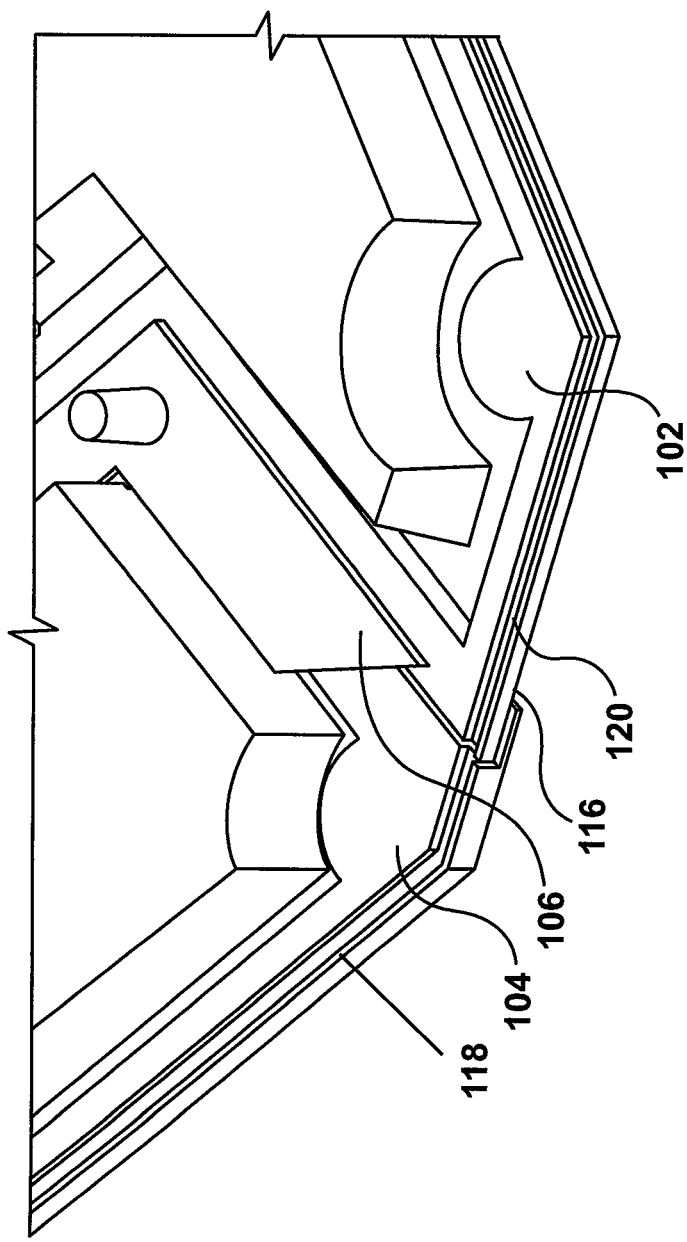
FIGS. 4c and 4d are magnified views of mating regions of the first and second carrier portions shown in FIGS. 4a and 4b.
Figure 4D:
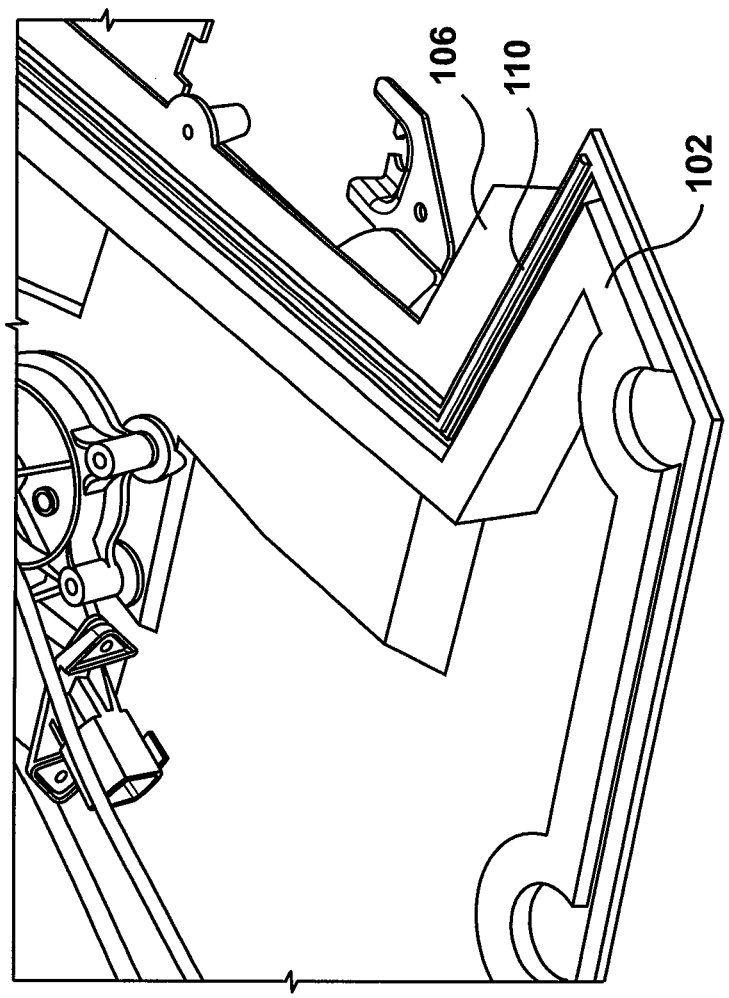
Figure 5:
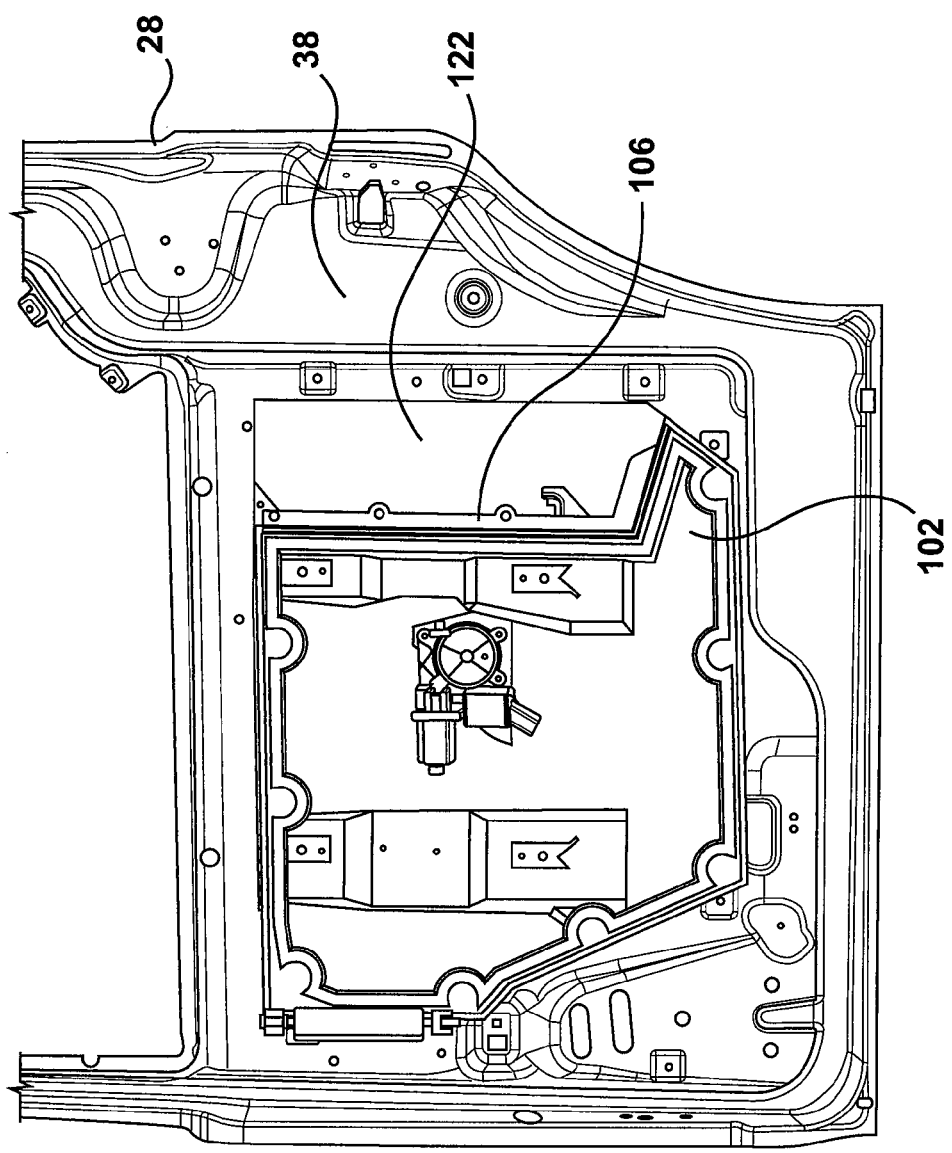
FIGS. 5 and 6 are plan views illustrating mounting of the first and second carrier portions of FIG. 3.

FIGS. 4a and 4b show the first and second carrier portions 102 and 104 separately as the unassembled door module 100. As can be seen in these figures, the first carrier portion 102 can include a second carrier mating flange 106, and the second carrier can have a first carrier mating flange 108. The seal member 110 can be provided in one (e.g. between) of the flanges 106 and 108. In the embodiment shown, the seal member 110 is provided in the second carrier mating flange 106 on the first carrier portion 102. The mating flanges 106 and 108 mate together when the first and second carrier portions 102 and 104 are mounted to the inner door panel 28 so as to seal against leakage therebetween to the dry side of the door module 100. The flanges 106 and 108 and the seal member 110 are shown in greater detail in FIGS. 4c and 4d. In the embodiment, a mating line between the first and second carrier portions 102 and 104 may be generally L-shaped, including a first portion 112 that extends downwards and a second portion 114 that extends slightly downwards and towards a trailing edge 116 of the first carrier portion 102. As a result, any water that collects in the space between the mating flange portions 106 and 108 drains downwards and towards the rear of the door module 100. Such water may be directed in this way so as to permit the water to drain from the door module proximate a drain aperture (not shown) for the water in the inner or outer door panels 28 and 26. Alternatively, the mating line of the flanges 106 and 108 may extend in any suitable direction such as straight downwards, though care can be taken to provide that there are no 'valleys' in the mating line that would result in the collection of water therein.

It can be noted that, when the first and second carrier portions 102 and 104 are mounted to the inner door panel 28, the flange 106 on the first carrier portion 102 is outboard of the flange 108 on the second carrier portion 104. In such embodiments, the flange 106 can thus be referred to as the outboard flange 106 and the flange 108 can thus be referred to as the inboard flange 108. The first and second carrier members 102 and 104 can further include peripheral seal members that would seal against the inner door panel 28 when the carrier portions 102 and 104 are mounted thereto. Channels (or other seal mounting locations) for receiving O-rings that could act as the peripheral seal members are shown at 118 and 120 respectively in FIG. 4c.

Figure 10:
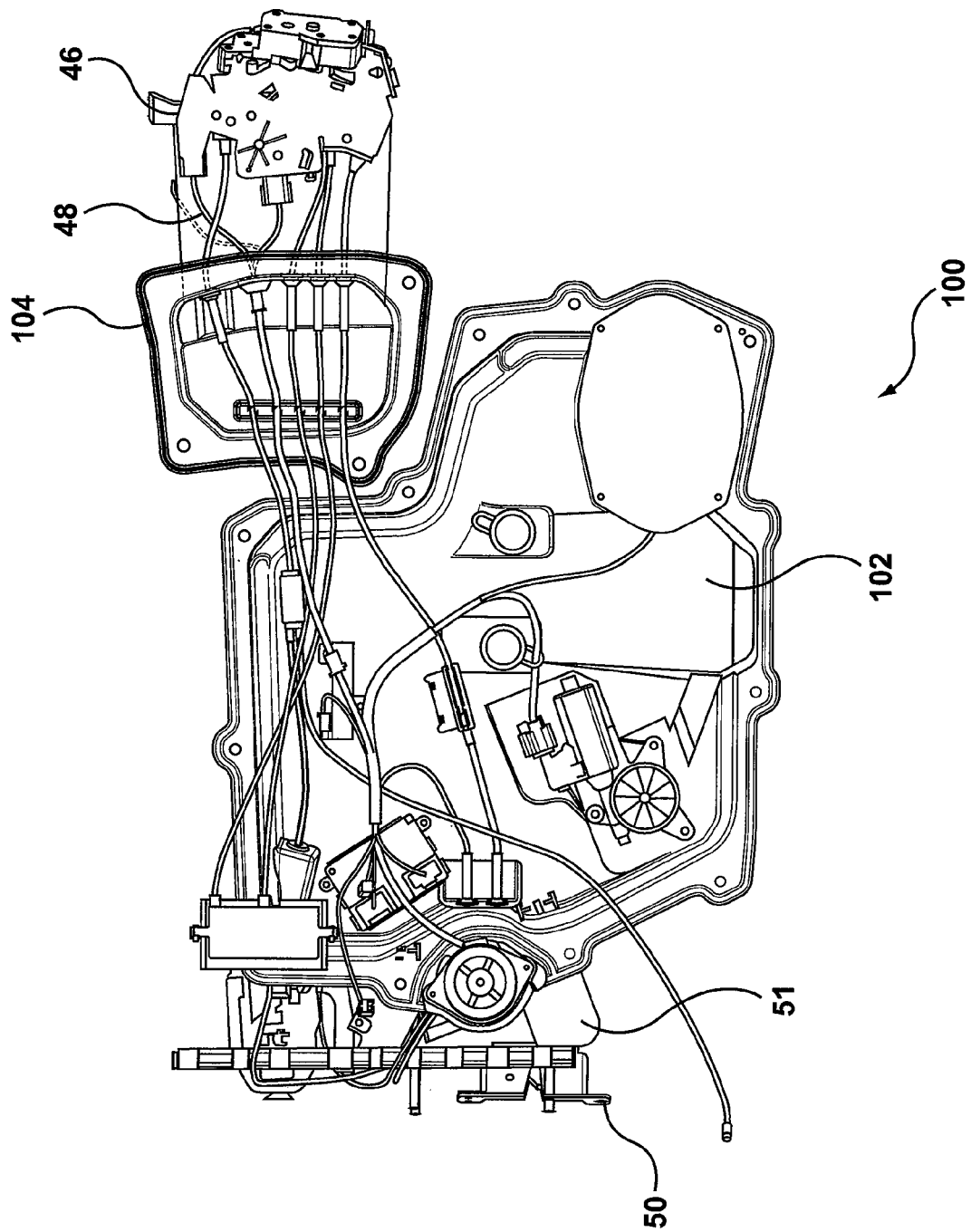
FIG. 10 is a further embodiment of the door module of FIG. 3.
Figure 11:
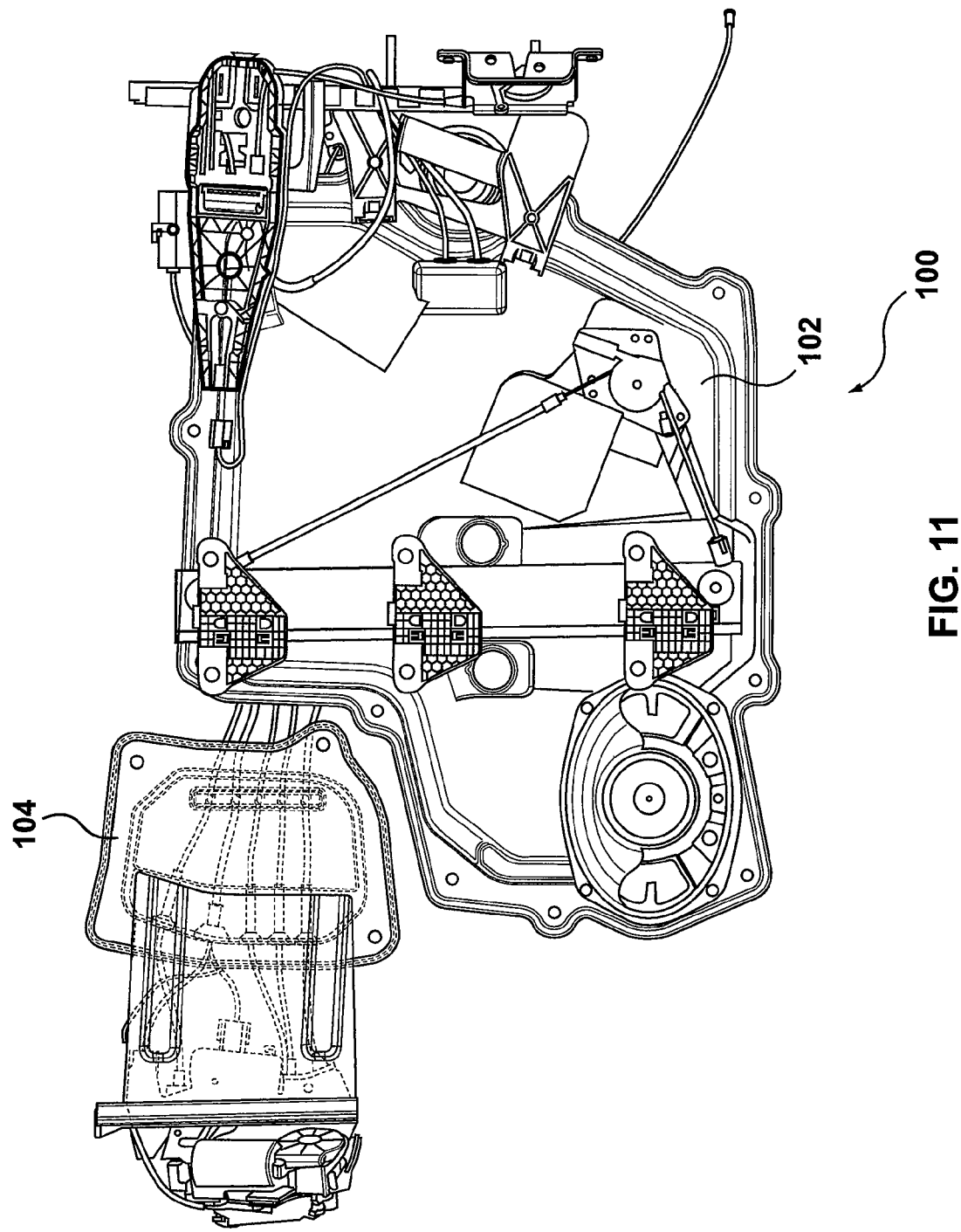
FIG. 11 is a wet side view of the door module of FIG. 10.

Reference is made to FIG. 10, which shows a further embodiment of the door module 100. As is the case with many door modules, the door module 100 may be mounted to the inner door panel 28, as shown in FIG. 6 to simplify the mounting of door hardware components 47 such as, for example, one or more of the aforementioned door hardware components 47 from the cinch latch 46 and the front latch 50, and any other suitable door hardware components 47. Aside from these aforementioned elements, the door module 100 includes the first carrier portion 102 and the second carrier portion 104. The first and second carrier portions 102 and 104 mount together to the inner door panel 28 to seal the aperture 40 (see FIG. 2), thereby defining a wet side of the door module 100 (i.e. the outboard side 36, which faces the door cavity 80), and a dry side to the door module 100 (i.e. the inboard side 38, which faces away from the door cavity 30 towards the interior of the vehicle 12). The first carrier portion 102 holds at least one door hardware component 47, which in the example shown in FIG. 10 includes the components that make up the front latch 50, which is mounted to the first carrier portion 102 via the front latch presenter 51. The second carrier portion 104 holds at least one other door hardware component 47, which in the example shown in FIG. 10 includes the cinch latch 46, which is mounted to the second carrier portion 104 via the cinch latch presenter 48. The inboard side of the door module 100 is shown in FIG. 10 while the outboard side of the door module 100 is shown in FIG. 11.

Figure 12:
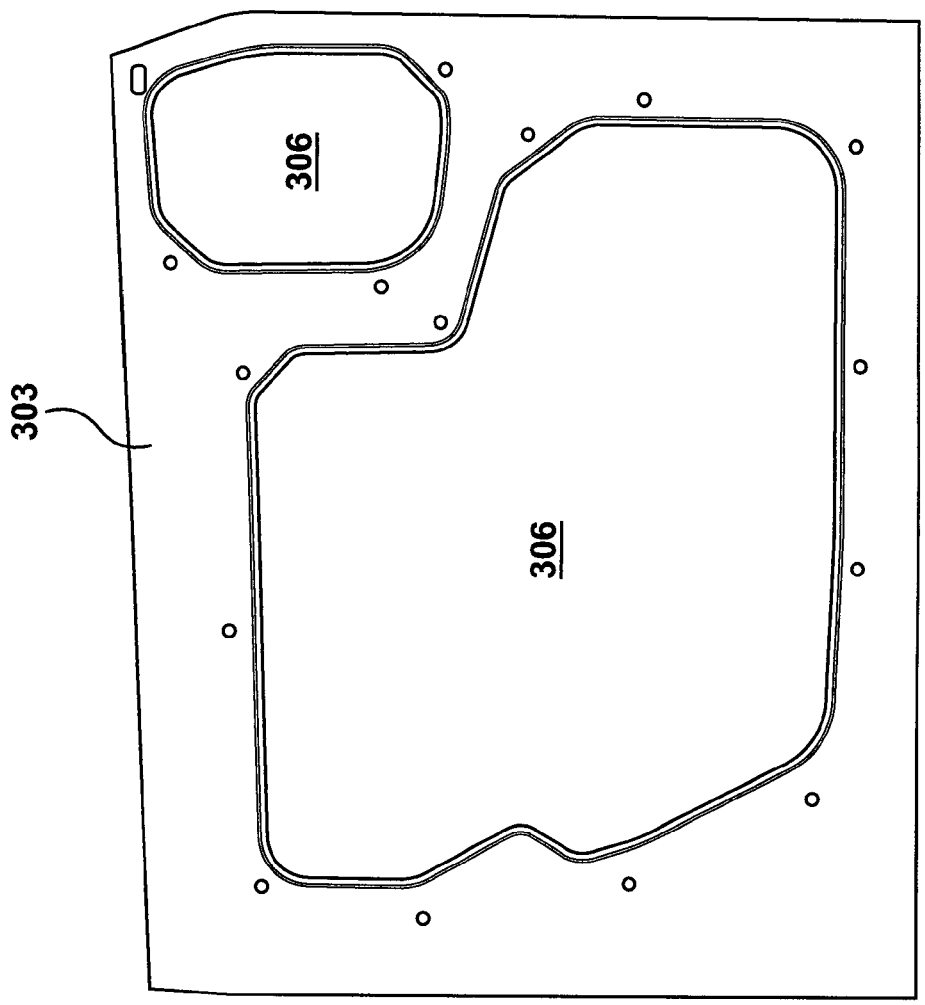
FIG. 12 is a further embodiment of the door module of FIG. 3.

Referring to FIG. 12, shown is a further embodiment of the door module 100 having a third carrier portion 303 for mounting the first and second carrier portions 302 and 304

Figure 13:
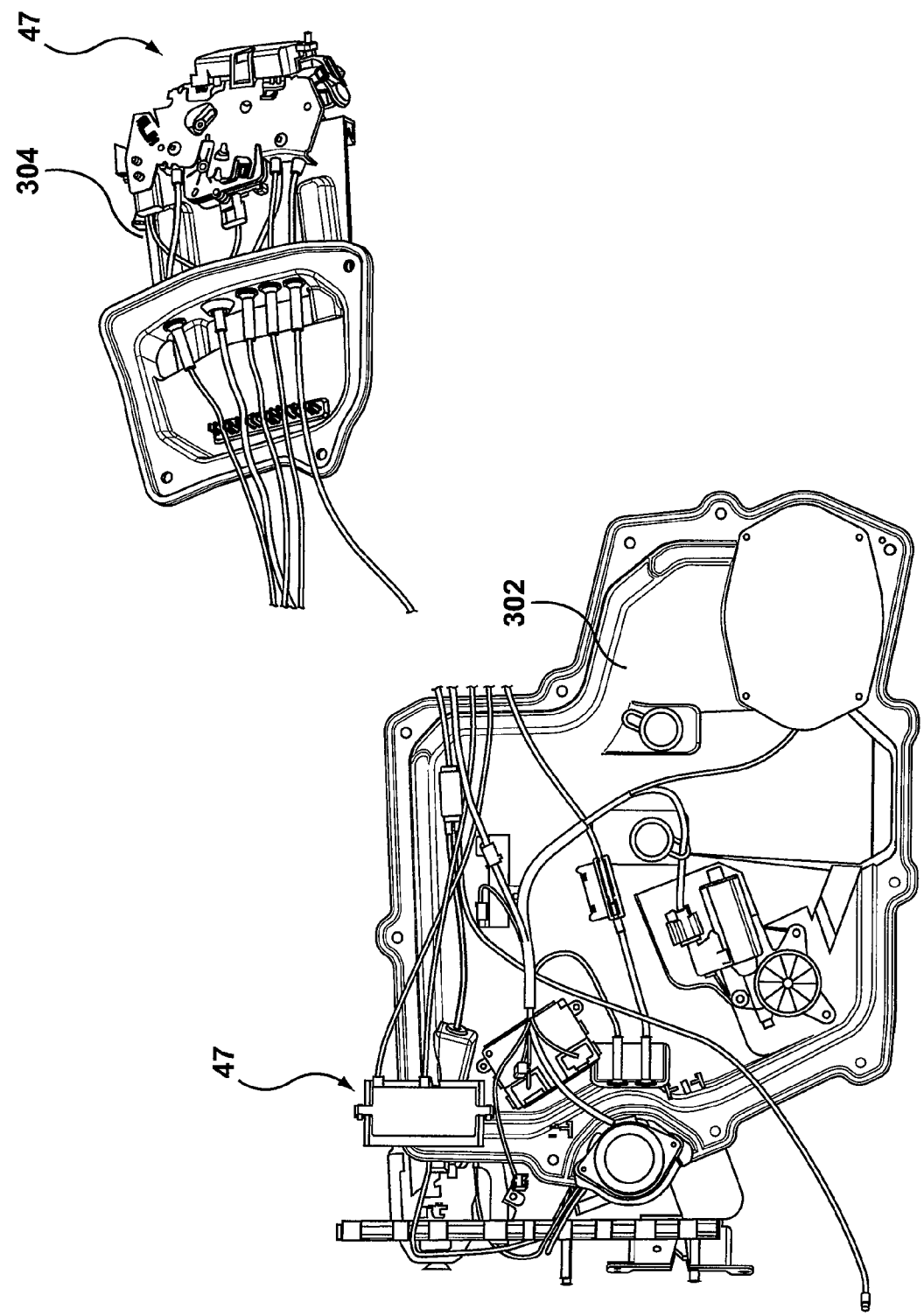
FIG. 13 shows a further carrier portions of the door module of FIG. 12.
Figure 14:
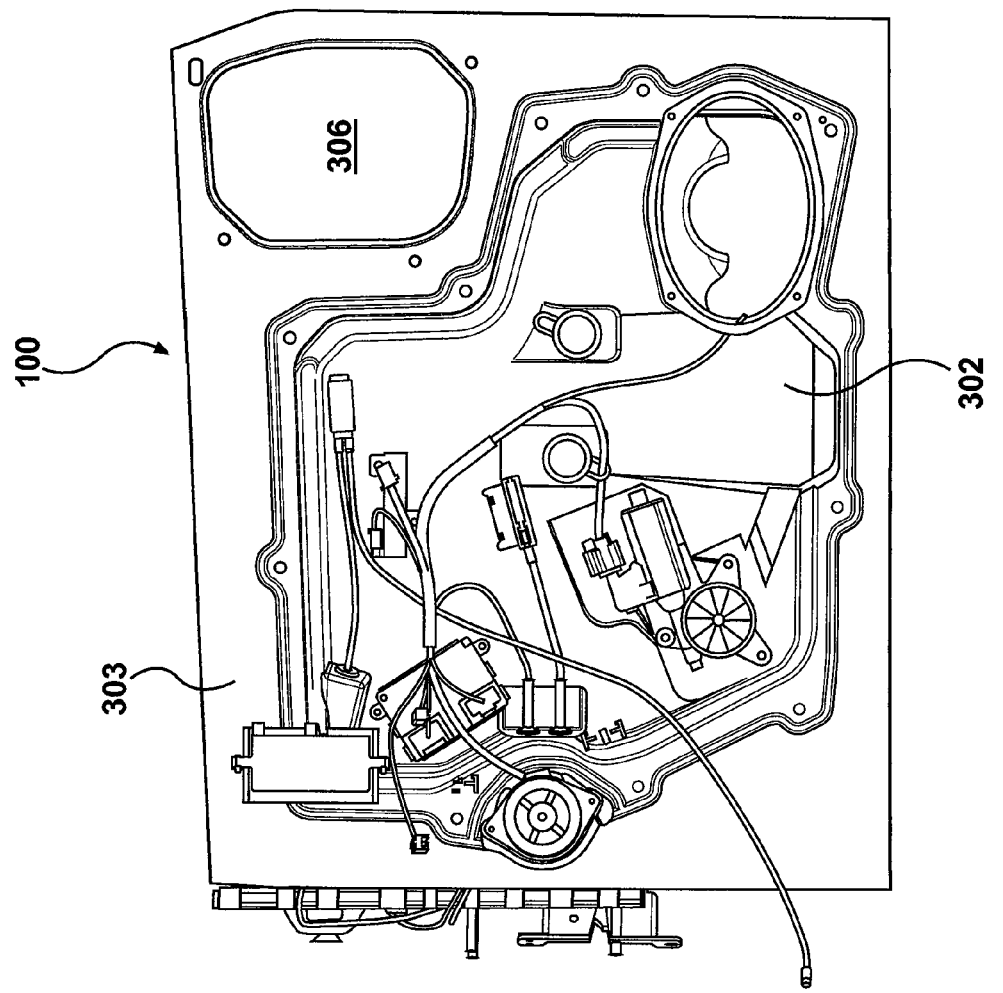
FIG. 14 shows a partially assembled view of the door module of FIG. 12.
Figure 15:
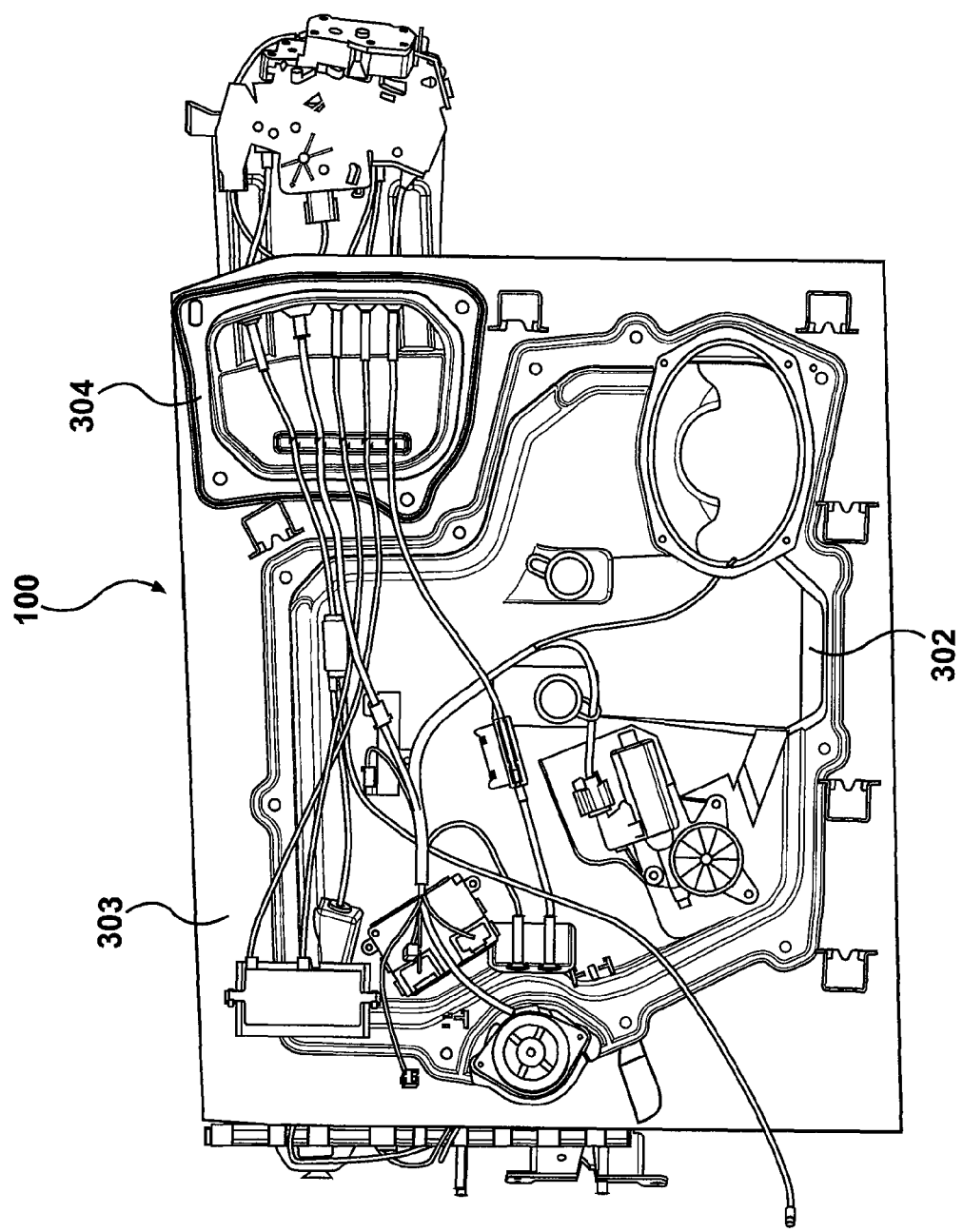
FIG. 15 shows a fully assembled view of the door module of FIG. 12.
Figure 16:
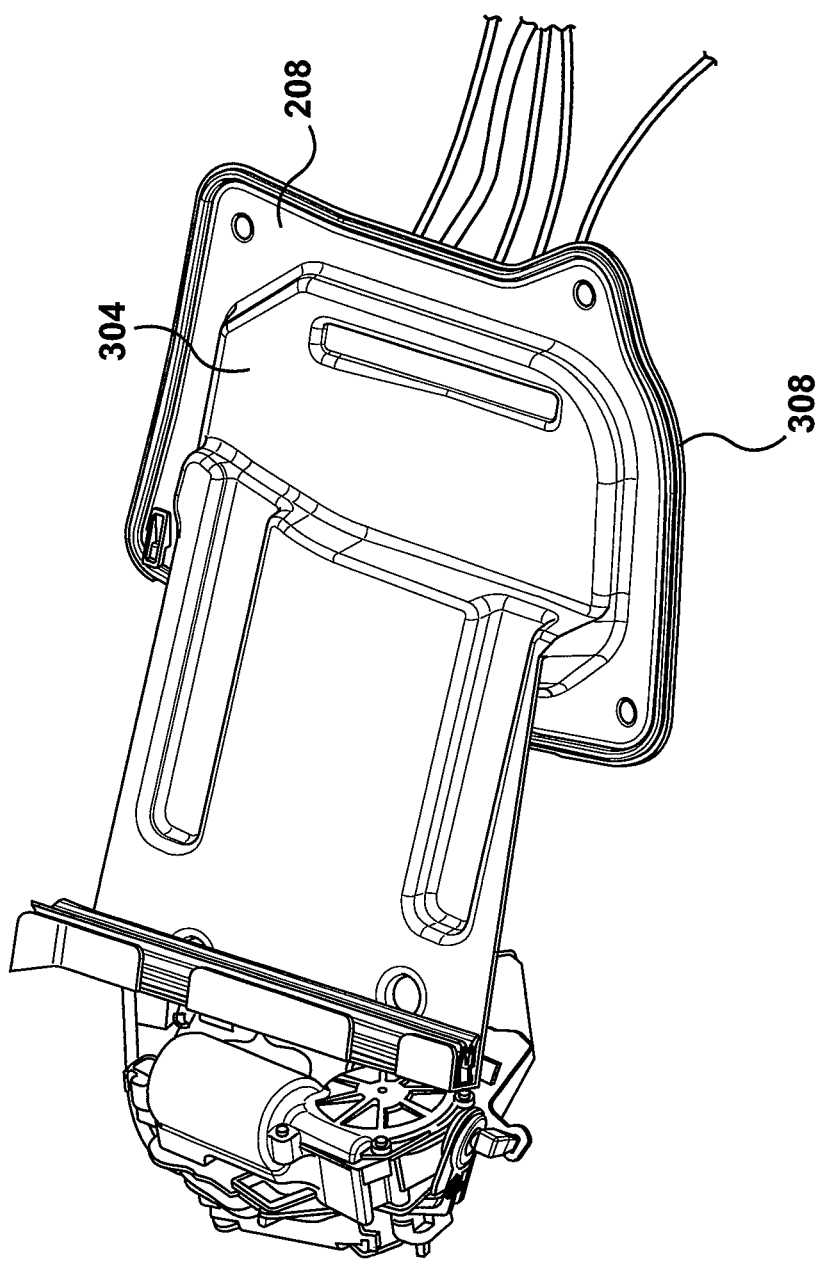
FIG. 16 show a seal member of the door module of FIG. 12.

(see FIG. 13) thereto. As such, the third carrier portion 303 can be used to connect the assemble door module 100 (see FIG. 15) to the door panel 28 (see FIG. 2), while apertures 306 in the third carrier portion 303 can be used to position and mount the first and second carrier portions 302 and 304 thereto in order to assemble the door module 100. In this manner, the door module 100 can be made up of a number of carrier portions 303,302,304, some or all of which can have hardware door components 47 mounted thereon. FIG. 14 shows a partially assembled door module 100, such that carrier portion 303 is connected to carrier portion 302 in one of the apertures 306, as compared to the fully assembled door module 100 of all carrier portions 303,302,304 prior to being assembled to the door panel 28 (see FIG. 2). As discussed above, it is recognized that the carrier portions 302,303,304 can be releasable attached to one another, for example using mechanical fasteners (e.g. nut and bolt, clips, etc.), so that the door module 100 can be partially disassembled in order to facilitate the removal of one (or more) of the carrier portions 302,303,304 (including their respective mounted door hardware component(s) 47) from the door panel 28 while providing for some of the carrier portions 302,303,304 (including their respective mounted door hardware component(s) 47) to remain connected a the door panel 28. Referring to FIG. 16, shown is carrier portion 304 having a co-molded seal 308, by example, on flange 208.

Figure 7:
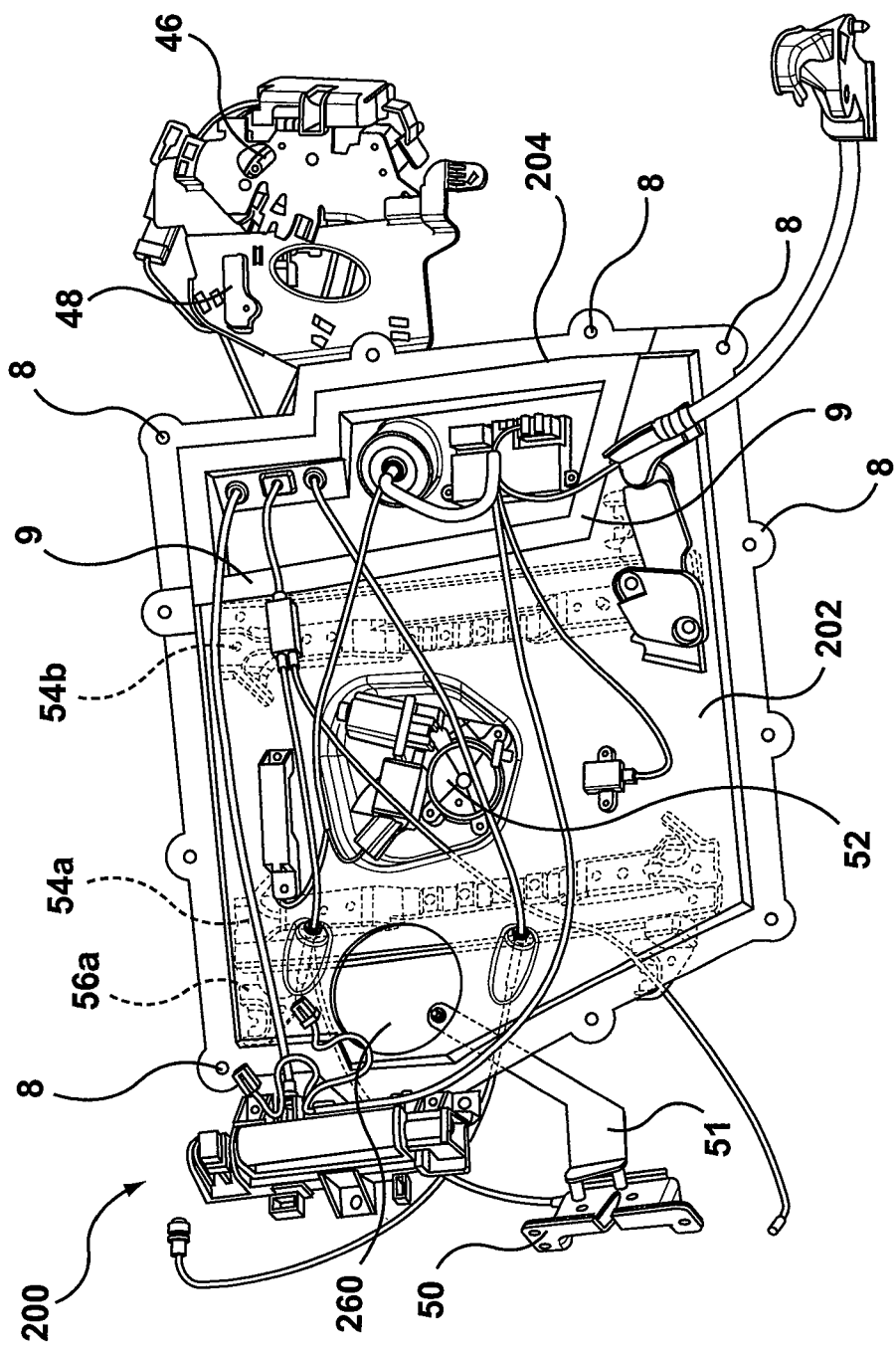
FIG. 7 is a further embodiment of the door module shown in FIG. 3.
Figure 8A:
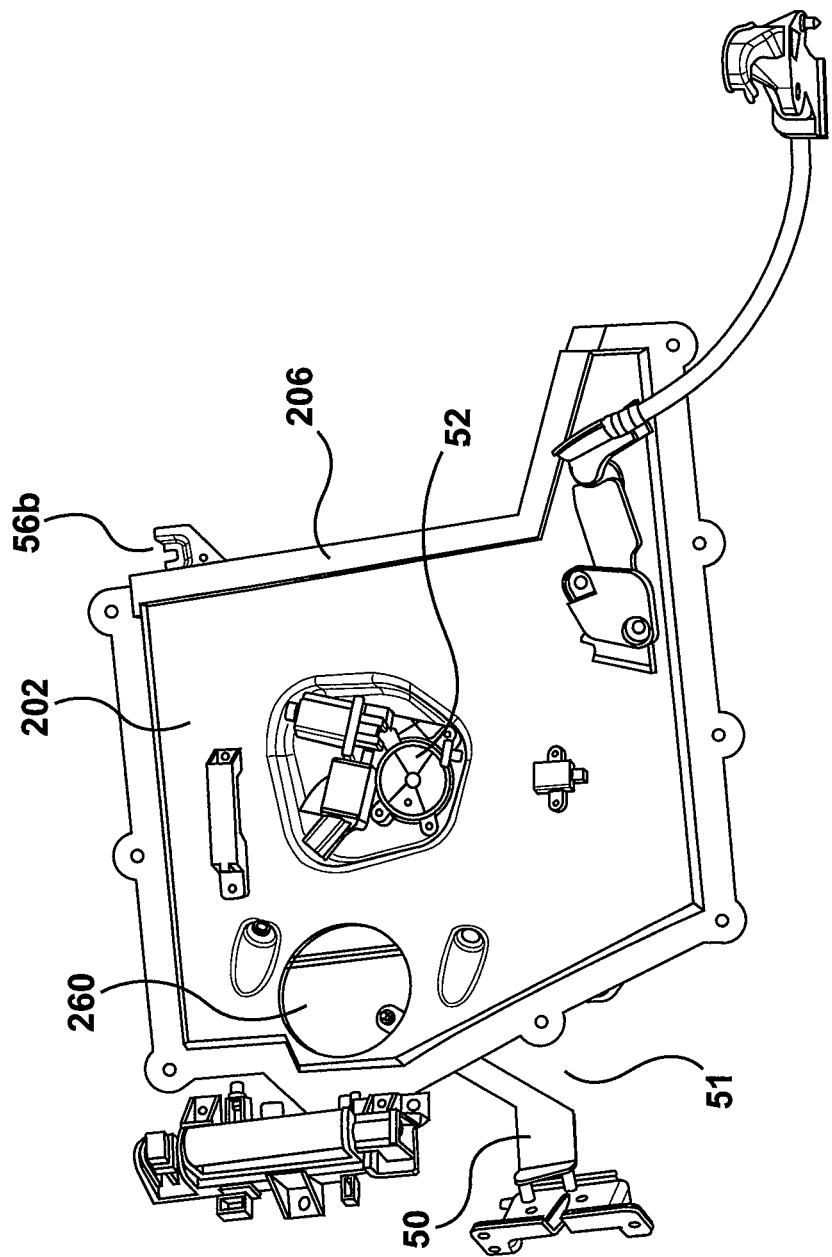
FIG. 8a is a plan view of the first carrier portion shown in FIG. 7.
Figure 8B:
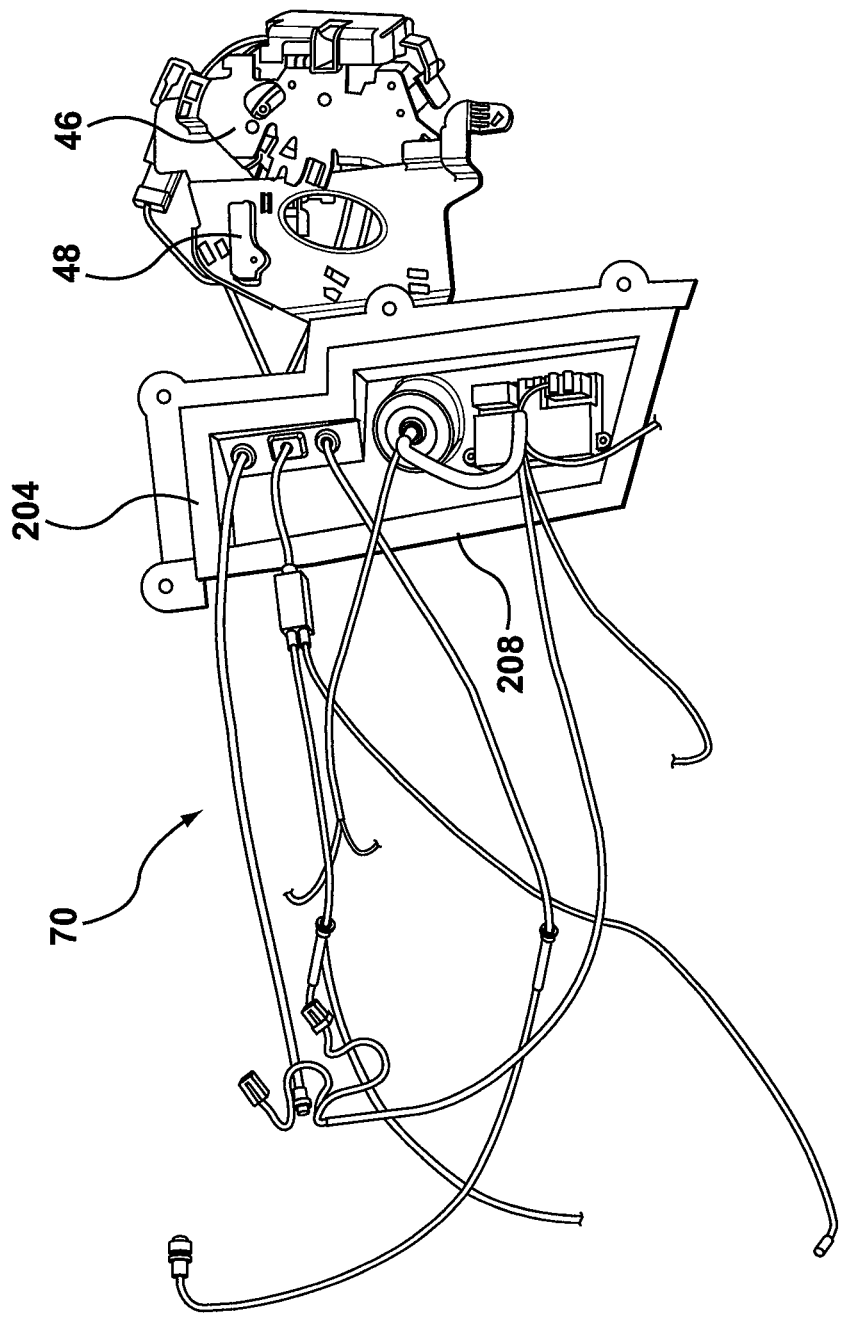
FIG. 8b is a plan view of the second carrier portion shown in FIG. 7.
Figure 9:
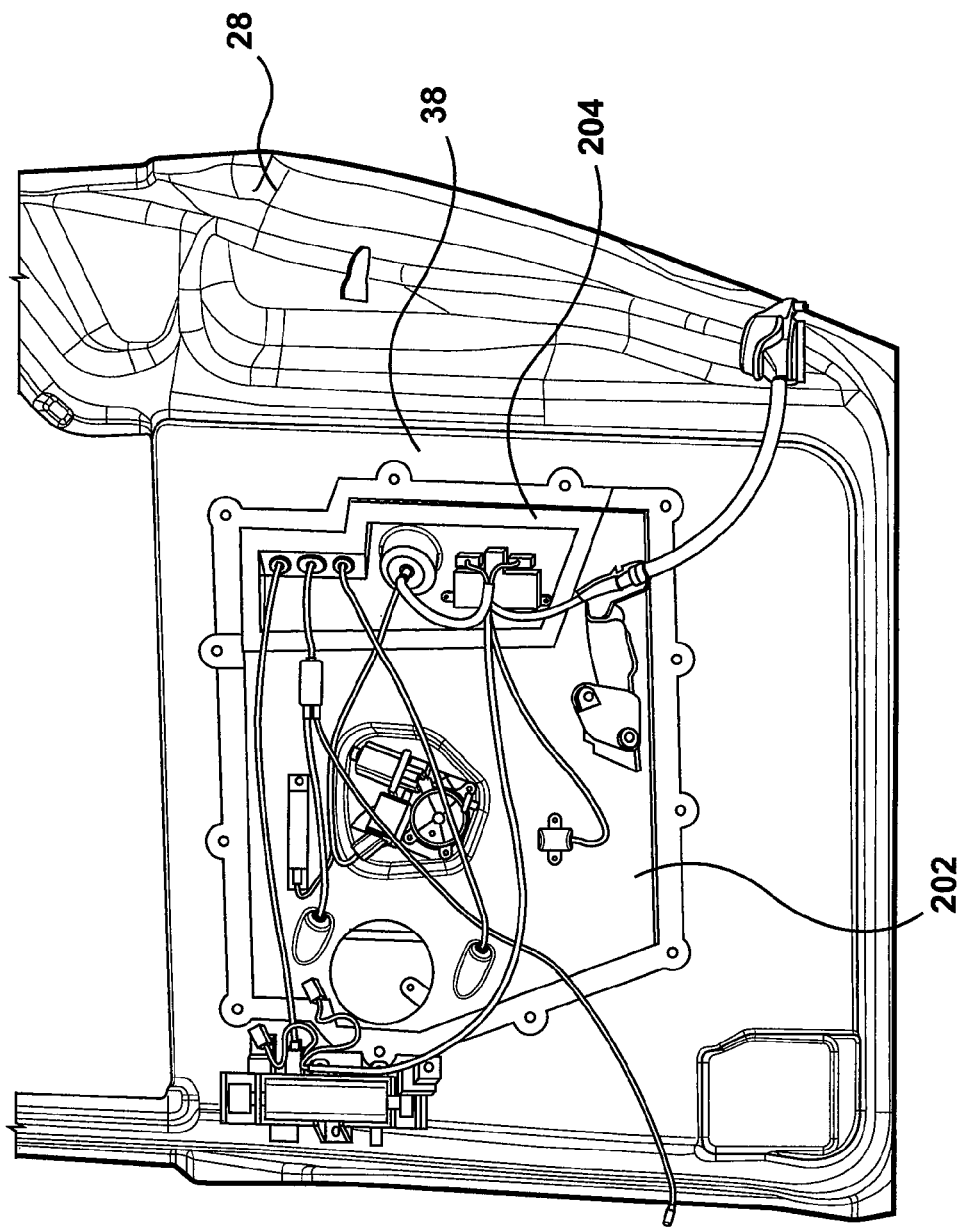
FIG. 9 is a plan view of the door module of FIG. 7 mounted to the inner door panel.

Reference is made to FIGS. 7-9 which show another embodiment of a door module shown at 200 that could be mounted to the inner panel 28. The door module 200 may be similar to the door module 100 and includes a first carrier portion 202 and a second carrier portion 204, which may mate together in similar manner to carrier portions 102 and 104 (FIGS. 3-6). A flange 206 (FIG. 8a) on the first carrier panel 202 may mate with a flange 208 (FIG. 8b) on the second panel 204 in similar fashion to the flanges 106 and 108 on the carrier portions 102 and 104 respectively (FIGS. 3-6).

The first carrier portion 202 includes a front latch access aperture 260 that permits access to the front latch 50. This permits cables that are provided on the second carrier portion 204 to be connected to the front latch 50 as necessary, even though the second carrier portion 204 is installed on the inner panel 28 after the first carrier portion 202 has been installed on the inner panel 28. As can be seen, in the embodiment shown, (and in the embodiment shown in FIGS. 3-6), the cables, which are shown at 70 in FIGS. 8b and 4b) are provided only on the second carrier portion 204 (or the carrier portion 104 in the embodiment shown in FIGS. 3-6) and are subsequently mounted to the first carrier portion 204 (or the first carrier portion 104 in the embodiment shown in FIGS. 3-6). If the cables 70 were provided on the first carrier portion, the cables 70 could in some situations obstruct the installation of the second carrier portion, by partially blocking the aperture 222 (or the aperture 122 in the embodiment shown in FIGS. 3-6). Thus, by providing the cables on the second carrier portion 204, the cables are less likely to obstruct the installation of the second carrier portion 204. While it is advantageous to have all of the cables 70 extending from the second carrier portion 204 and to be unmounted to the first carrier portion 202 prior to mounting of the first carrier portion 202 to the inner panel 28, not every cable 70 has to extend from the second carrier portion 204. It is possible for substantially all of the cables 70 to extend from the second carrier portion 204 but to have some cables extend from the first carrier portion 202 instead. In any of the embodiments shown in the figures, it will be noted that the cables 70 that extend from the second carrier portion 204 may be mounted to the first carrier portion 202 after the first carrier portion 202 is mounted to the inner panel 28, or alternatively after both the first and second carrier portions 202,204 are mounted to the inner panel 28.

In view of the above different embodiments of the door module 100, one example configuration will be used by way of example for illustration of assembly. The door module 100 (of FIG. 3) can be mounted to the inner door panel 28 (of FIG. 2) as follows. The first assembly 102 with the aforementioned hardware door components 47 (e.g. window regular and front latch components mounted thereto) can be manipulated so as to fit the window regulator components and the front latch 50 through the aperture 40 in the inner door panel 28, and fasteners such as mechanical fasteners may be used to mount the first carrier portion 102 to the inner door panel 28. Subsequent to the mounting of the first carrier portion 102, the second carrier portion 104 can be mounted to the inner door panel 28, by passing the cinch latch 46 through a remaining aperture 122 (FIG. 5) formed between the first carrier portion 102 and the inner door panel 28 and then mating the second carrier portion 104 with both the inner door panel 28 and the first carrier portion 102. Thus, the first carrier portion 102 may be sized so as to form a remaining aperture 122 with the inner door panel 28 that is sufficiently large to permit the pass-through of any necessary door hardware components on the second carrier portion into the door cavity 30 (FIG. 1a). Alternatively, the first and second carrier portions 102,104 can be fastened to one another and then the resulting door module 100 can be fastened to the aperture 40 of the inner panel 28, as desired.

After the first and second carrier portions 102 and 104 are mounted to the inner door panel 28, the cables that are associated with the various components on one carrier panel, (e.g. the actuation cables for mechanical actuation of the front latch 50 and the power cables to electrical components such as the window regulator motor and drum assembly 52 on the first carrier portion 102), may be fitted as necessary to the restraints in the other carrier portion (in this example, carrier portion 104).

It will be noted that, due to the fact that flange 106 on the first carrier portion 102 is outboard of the flange 108 on the second carrier portion 104, the second carrier portion 104 can be removed from the inner door panel 28 without the removal of the first carrier portion 102 from the inner door panel 28. As a result, in the event that the cinch latch 46 fails and requires repair or replacement, the cinch latch 46 can be removed from the inner door panel 28 without having to remove the entire door module 100. This can reduce the amount of time and effort that is required to repair or replace the cinch latch 46, and the associated cost.

While the second carrier portion 104 may mount to both the inner door panel 28 and to the first carrier portion 102, it is alternatively possible for the second carrier portion to mount only to the inner door panel 28 and to abut the first carrier portion 102 without mounting to the first carrier portion 102.

Aside from reducing the cost of repairing or replacing the cinch latch 46, another advantage of the door module 100 is that the carrier portions 102 and 104 can each be configured to be below a selected weight when carrying their respective door hardware component(s) 47. As a result of the reduced weight, the manipulation of the two carrier portions 102 and 104 can be easier by a single worker, in the case where the door module 100 is assembled one carrier portion 102,104 at a time to the inner panel 28, thereby facilitating the insertion of their associated components through the aperture 40. By contrast, for some prior art door modules 42 comprising a single carrier 44 (see FIG. 2), two workers or a worker and a robot may be required to hold and manipulate the door module 42 so as to limit the amount of weight each worker has to handle.

While the door modules 100,200 has been shown to include only two or three carrier portions, it will be understood that there could alternatively be four or more carrier portions. It is also recognized that not all carrier portions need to carry functional door hardware components 47, as shown by example for the carrier portion 303 of FIG. 15.

Further, while the second carrier portion 104 has been shown and described as holding the cinch latch 46, it will be noted that the carrier portion 104 could hold other door hardware components 47 in addition to the cinch latch 46. In some embodiments the carrier portion 104 could be arranged in a different location in relation to the carrier portion 102 and could hold different door hardware components 47 entirely.

While the above description constitutes specific examples, these examples are susceptible to further modification and change without departing from the fair meaning of the accompanying claims.

We claim:

1. A vehicle door for providing access to a vehicle interior, the vehicle door comprising:
    an outer door panel;
    an inner door panel connected to the outer door panel defining a door cavity there-between, the inner door panel having an aperture for providing access to the door cavity;
    a door module mounted to the inner door panel about the aperture by one or more module fasteners, the door module including a first carrier portion having mounted thereon a window regulator as a first functional door hardware component coupled to a window for moving the window up and down, a second carrier portion having mounted thereon a second functional door hardware component, the first carrier portion releasably secured directly to the second carrier portion by one or more carrier fasteners, wherein the second carrier portion with the second functional door hardware component mounted thereon is configured as removable from the inner door panel by releasing the one or more carrier fasteners while maintaining the mounting of the first carrier portion with the first functional door hardware component on the inner door panel by the one or more module fasteners and without any removal of the coupling between the window and the first functional door hardware component; and
    a first seal member between the door module and the inner door panel for sealing the aperture to inhibit communication of moisture from the cavity to the vehicle interior.

2. The vehicle door as claimed in claim 1 further comprising a second seal member between the first carrier portion and the second carrier portion to inhibit communication of the moisture between the first carrier portion and the second carrier portion, the second seal member cooperating with other seal members of the first carrier portion and the second carrier portion for sealing between a wet side and dry side of the door module.

3. The vehicle door as claimed in claim 2, wherein the second carrier portion sealingly engages the first carrier portion by the second seal member as a co molded seal.

4. The vehicle door as claimed in claim 2, further comprising a plurality of cables associated with the second functional door hardware component, wherein the plurality of cables extend from the second carrier portion and are also mounted to the first carrier portion.

5. The vehicle door as claimed in claim 1, wherein the second carrier portion is mounted to both the inner door panel by the one or more module fasteners and the first carrier portion by the one or more carrier fasteners.

6. The vehicle door as claimed in claim 1, wherein the vehicle door is sliding vehicle door and the second carrier portion has a cinch latch as the second functional door hardware component, the cinch latch configured for holding a rear portion of the sliding vehicle door against a vehicle body.

7. The vehicle door as claimed in claim 6, wherein the first carrier portion has a front latch as further functional door hardware component, the front latch configured for holding a front portion of the sliding vehicle door against the vehicle body, the first carrier portion inhibiting access to the front latch via a pass-through aperture.

8. The vehicle door as claimed in claim 6 or 7, wherein a distance from a peripheral edge of the front latch to a peripheral edge of the cinch latch is greater than the size of the aperture, and wherein the front latch and the cinch latch are positioned on an outboard side of the inner door panel and wherein the first and second carrier portions mount to an inboard side of the inner door panel.

9. The vehicle door as claimed in claim 1, wherein the first second functional door hardware component is a cinch latch and the second carrier portion has a mounting portion for a presenter for mounting the cinch latch.

10. The vehicle door as claimed in claim 1, wherein a further functional door hardware component includes a cinch front latch and the second first carrier portion includes a mounting portion for a presenter for mounting the front latch.

11. A vehicle door module for mounting to a vehicle door including an inner door panel connected to the outer door panel defining a door cavity there-between, the inner door panel having an aperture for providing access to the door cavity, the door module comprising:
    a plurality of carrier portions including a first carrier portion that has a window regulator as a first functional door hardware component mounted thereon and coupled to a window for moving the window up and down, and a second carrier portion that has a second functional door hardware component mounted thereon, the first carrier portion releasably secured directly to the second carrier portion, wherein the second carrier portion with the second functional door hardware component mounted thereon is configured as removable from the inner door panel while maintaining the mounting of the first carrier portion with the first functional door hardware component on the inner door panel and without any removal of the coupling between the window and the first functional door hardware component; and
    a first seal member for situating between the door module and the inner door panel for sealing the aperture to inhibit communication of moisture from the cavity to the vehicle interior.

12. The vehicle door module as claimed in claim 11 further comprising a second seal member between the first carrier portion and the second carrier portion to inhibit communication of the moisture between the first carrier portion and the second carrier portion, the second seal member cooperating with other seal members of the first carrier portion and the second carrier portion for sealing between a wet side and dry side of the door module.

13. The vehicle door module as claimed in claim 12 further comprising a plurality of cables associated with the second functional door hardware component, wherein the plurality of cables extend from the second carrier portion and are also mounted to the first carrier portion.

14. The vehicle door module as claimed in claim 11, wherein the second carrier portion is mounted to both the inner door panel by the one or more module fasteners and the first carrier portion by the one or more carrier fasteners.

* * * * *